United States Patent
Ju et al.

(10) Patent No.: US 9,783,442 B2
(45) Date of Patent: Oct. 10, 2017

(54) DIGESTION OF WASTE ACTIVATED SLUDGE WITH ALGAE

(71) Applicants: Ovivo Inc., Montreal (CA); The University of Akron, Akron, OH (US)

(72) Inventors: Lu-Kwang Ju, Akron, OH (US); Hiren K. Trivedi, Cedar Park, TX (US)

(73) Assignees: Ovivo Inc., Montreal (CA); The University of Akron, Akron, OH (US)

( * ) Notice: Subject to any disclaimer, the term of this patent is extended or adjusted under 35 U.S.C. 154(b) by 0 days.

(21) Appl. No.: 14/866,735

(22) Filed: Sep. 25, 2015

(65) Prior Publication Data

US 2016/0090317 A1    Mar. 31, 2016

Related U.S. Application Data

(60) Provisional application No. 62/056,341, filed on Sep. 26, 2014.

(51) Int. Cl.
| | | |
|---|---|---|
| *C02F 3/32* | (2006.01) | |
| *C02F 11/02* | (2006.01) | |
| *C02F 11/04* | (2006.01) | |
| *C02F 1/66* | (2006.01) | |
| *C02F 11/12* | (2006.01) | |

(52) U.S. Cl.
CPC .............. *C02F 3/322* (2013.01); *C02F 1/66* (2013.01); *C02F 11/02* (2013.01); *C02F 11/04* (2013.01); *C02F 11/12* (2013.01); *Y02W 10/27* (2015.05)

(58) Field of Classification Search
CPC .. C02F 3/322; C02F 1/66; C02F 11/02; C02F 11/04; C02F 11/12
USPC ................................ 210/602, 613, 631
See application file for complete search history.

(56) References Cited

U.S. PATENT DOCUMENTS

| | | | |
|---|---|---|---|
| 3,780,471 A | 12/1973 | Ort | |
| 5,275,733 A * | 1/1994 | Burnham | ............... C02F 1/586 |
| | | | 210/609 |
| 2010/0297714 A1 * | 11/2010 | Ju | .......................... A01G 33/00 |
| | | | 435/134 |

FOREIGN PATENT DOCUMENTS

| | | |
|---|---|---|
| WO | WO2009008839 | 7/2009 |
| WO | WO2014194174 | 12/2014 |

OTHER PUBLICATIONS

Merriam-Webster Online Dictionary, Definition of "disposal," generated on Apr. 23, 2017.*
Salerno et al., "Biogas Production from Algae Biomass Harvested at Wastewater Treatment Ponds", ASABE Bioenergy Engineering Conference Presentation, Paper No. Bio098023, Oct. 11-14, 2009, 5 pages, US.
Golueke et al., "Anaerobic Digestion of Algae", Sanitary Engineering Research Laboratory, Dept. of Engineering, University of CA, Berkeley, CA, Sep. 4, 1956, p. 47-55, US.

* cited by examiner

*Primary Examiner* — Fred Prince
(74) *Attorney, Agent, or Firm* — Thomas M. Freiburger

(57) ABSTRACT

Phagotrophic algae are used in connection with aerobic or anaerobic digestion of solids, especially waste activated sludge (WAS), to more efficiently digest solids and to meet, over a shorter period of time, volatile solids standards and specific oxygen uptake rate requirements as well as pathogen reduction requirements.

12 Claims, 2 Drawing Sheets

DIGESTION OF WASTE ACTIVATED SLUDGE WITH ALGAE

This application claims benefit of provisional application No. 62/056,341, filed Sep. 26, 2014.

BACKGROUND OF THE INVENTION

This invention concerns digestion of solid organic material, for example solids from sewage waste, in a process of a wastewater treatment plant. In particular, the invention concerns the use of phagotrophic algae in connection with aerobic or anaerobic digestion of solids, especially waste activated sludge (WAS), to more efficiently digest solids, so as to meet over a shorter period of time, volatile solids standards and specific oxygen uptake rate requirements as well as pathogen reduction requirements.

Reference is made to U.S. Pat. No. 3,780,471; Salerno et al., "Biogas Production from Algae Biomass Harvested at Wastewater Treatment Ponds", ASABE Bioenergy Engineering Conference Presentation, Paper No. Bio098023, Oct. 11-14, 2009; Golueke et al., "Anaerobic Digestion of Algae", Sanitary Eng. Res. Lab., Dept. of Engineering, Univ. of CA, Berkeley, Calif., Sep. 4, 1956; and PCT Publication WO 2009/088839. The latter publication describes a method to produce an algae product utilizing algae, including phagotrophic algae. The process involves introduction of the algae to a liquid growth medium including microorganisms, so that the algae consume the microorganisms. The liquid growth medium can comprise organic waste products. The end product is a useful, saleable algae product.

Overall, the previous published application (WO 2009/088839), as well as currently pending PCT application published as WO 2014/194174, to which this application is related, pointed toward growing phagotrophic algae by exposing it to various organic waste material including waste activated sludge (WAS, typical by-product of biological wastewater treatment). Pre-treatment before algae growth was also discussed, one pre-treatment being partial breakdown of biological microbe cell structures using ultrasound. Any of the pretreatment options discussed in these published applications can also be used with the current process described below. Also, any of the phagotrophic algae species listed in the published applications are candidates for the processes described herein. In the disclosures of the publications the object and the end result were the production of algal biomass, which could then be applied for other uses. Neither disclosure was directed toward more efficient digestion of algae-rich biomass as an end in itself, which may even include total die-off of algae in some applications. WO 2014/194174 is incorporated herein by reference in its entirety.

SUMMARY OF THE INVENTION

The invention encompasses an improvement in the process of aerobic or anaerobic digestion of WAS, which may be combined with or include other organic wastes such as from restaurants or other sources (such as primary sludge), as in a co-digestion process. The term WAS as used herein is intended to include such combined biomass, as well as WAS in its usual meaning. Efficiency of these processes can be greatly increased, with reduced digester retention times, by the introduction of phagotrophic algae to the digestion process, the algae consuming the digesting microorganisms and, if the process is carried to an end, ultimately consuming itself or dying off.

In this process the phagotrophic algae are subjected to an aerobic or anaerobic environment wherein the lack of external food forces the algae to rely on endogenous respiration resulting in its degradation (digestion process).

The end objectives of the invention can be either to:
1. In case of aerobic digestion: meet regulatory requirements, i.e., low volatile solids (VS) and/or low specific oxygen uptake rates (SOUR) and pathogen reduction after digestion for safe disposal, in a process more efficient than previously practiced.
2. In case of anaerobic digestion: generate biogas/energy through VS reduction, also in a more efficient process than conventional anaerobic digestion.

In the conventional aerobic digestion, the VS reduction and the associated SOUR reduction are mostly the result of endogenous metabolism under the starving condition of no external food sources. By these metabolic activities, the microorganisms are consuming their intracellular biomass for getting the minimal energy required to maintain their survival. The kinetic rates of these survival-by-self-destruction activities are believed to be much slower than the rates when the microorganisms are actively growing in the presence of external food sources. On the other hand, in the process of digestion by mixing WAS (which may include other organic wastes as defined herein) with the phagotrophic algae, the phagotrophic algae are actively preying on the small microorganisms in WAS as external food source. The phagotrophic algae-based VS reduction appears to be more active, i.e., at higher rates, than the VS reduction by the microbes' own survival-by-self-destruction mechanism, in the initial phase of digestion when plenty of small microorganisms are around as food to the phagotrophic algae.

Then, after the concentration of these small microorganisms has been rapidly reduced, the phagotrophic algae themselves are starved. Unlike the typical heterotrophic microorganisms in WAS, the phagotrophic algae survive in their natural environments by photosynthesis (using light energy for survival) when organic/microbial food sources are not available. Also, being eukaryotic cells without cell walls to help them maintain cell integrity, the phagotrophic algae require much higher energy to maintain their survival. In the dark digestion processes, they will quickly die off. The combined sequence of destroying the small microorganisms in WAS followed by the rapid death of phagotrophic algae starved of both external food sources and light energy for their survival, leads to faster VS reduction and earlier attainment of low SOUR for meeting the regulatory criteria. Longer retention times will lead to increased VS reduction and should lead to lower SOUR. Importantly, the phagotrophic algae are also useful in consuming pathogens/coliforms.

DESCRIPTION OF PREFERRED EMBODIMENTS

Figure 1:
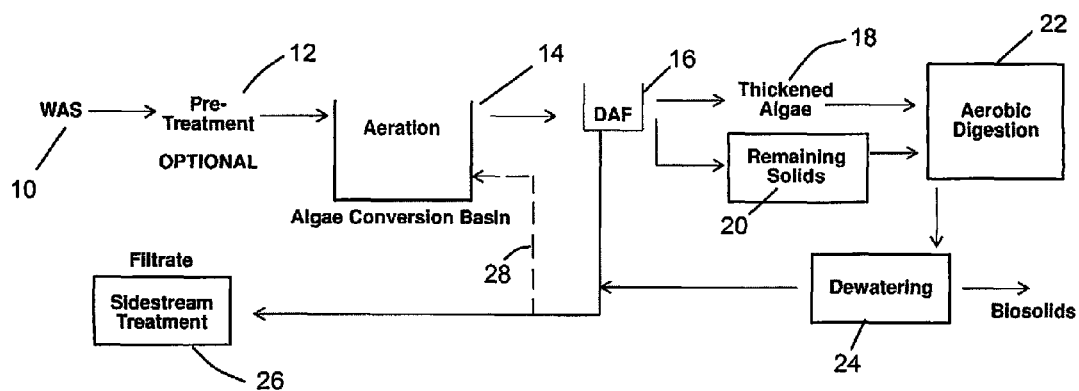
FIGS. 1 and 2 are simple flow diagrams illustrating the process of the invention for aerobic digestion and for anaerobic digestion, respectively.

FIG. 1 shows a process of the invention wherein algae is introduced to enhance aerobic digestion. As indicated, incoming WAS 10 may optionally be subjected to pretreatment 12, which could be pH adjustment, a short period of anaerobic digestion, ultrasound or other pretreatment steps mentioned herein and in the incorporated published applications. Pretreatment helps facilitate more thorough consumption of microbes by the algae. The drawing shows the process essentially as a batch process, although it can be continuous or continuous but staged.

The WAS 10 enters an algae conversion basin 14, under aerated conditions. The basin or zone 14 contains an active population of phagotrophic algae.

A portion of the WAS-algae mixture is removed from the basin 14, leaving a remaining portion in the basin for further WAS to be introduced into the basin.

After removal from the basin 14 the WAS-algae mixture preferably goes to some form of thickening process, shown as DAF 16 in the drawing (dissolved air flotation). Other thickening processes can be used, such as membranes or other phase separation methods. The thickened algae and remaining solids 20 are then subjected to aerobic digestion as indicated in the drawing at 22. Multiple streams are shown because in the case of DAF, two or three streams will emerge. From the top will be concentrated algae in this case; a middle portion will be primarily water and the bottom portion will have settlable solids. The middle/water portion can (optionally) be recycled back to the algae conversion tank 14 (as indicated by arrow 28) and the rest can be sent back to the head of the plant. This recycle can capture any additional organic carbon from the supernatant/filtrate stream.

The aerobic digestion 22 continues until targets are met. The drawing shows dewatering of the digested biomass at 24, and the removed water can be joined with filtrate from the step 16 for sidestream treatment 26.

Figure 2:
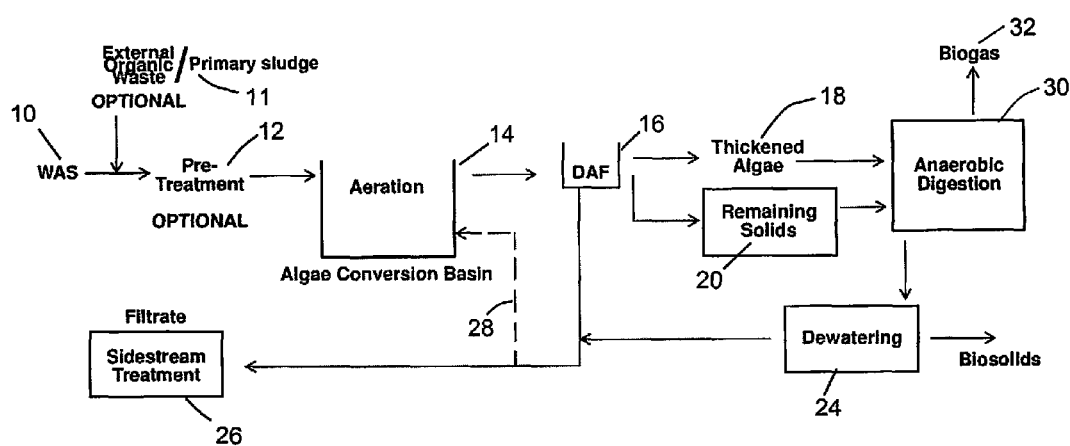

FIG. 2 shows the algae-based process used with anaerobic digestion. WAS 10 enters the system and may be supplemented with external organic waste and/or primary sludge as indicated at 11. This is optional and is sometimes used to provide additional food for microbes in anaerobic digestion systems. Again, optionally a pretreatment step 12 can be performed on the WAS.

The WAS is mixed with algae in the basin 14 as explained above for FIG. 1, and the step 16 is also similar. The thickened algae and solids 18, 20 then go into anaerobic digestion 30 as indicated in the drawing. Biogas is given off and collected as noted at 32, from the anaerobic digestion. Dewatering is shown at 24, and the liquids can be treated as indicated at 26.

The following examples show results of tests of the new process for both aerobic and anaerobic digestion of WAS, with comparison to conventional WAS digestion using only inherent bacterial microorganisms.

EXAMPLE 1

Aerobic Digestion with Algae

| Initial VS | 15-20000 | mg/L |
| T | 20-25 | ° C. |

| Sample Composition | Days | VS Reduction |
| --- | --- | --- |
| 100% WAS | 13 | 35-40% |
| 99.5% WAS + 0.5% Algae | 5 | 35-40% |

-continued

| Sample Composition | Days | SOUR |
| --- | --- | --- |
| 100% WAS | 7 | 1.5 mg/g TS-h |
| 99.5% WAS + 0.5% Algae | 4 | 1.5 mg/g TS-h |

As shown in the table, initial VS content was 15,000 to 20,000 mg/L, and temperatures were in the conventional range, for both the conventional process (100% WAS) and the algae process. The process was carried to the point of meeting standards for volatile solids reduction and for specific oxygen uptake rates (SOUR), which are the figures shown in the table (the process could be carried further if desired). The algae process was begun with introduction of phagotrophic algae to WAS (which contained bacterial microorganisms), at a rate of about 99.5% WAS and 0.5% algae. The results show that the target VS reduction required thirteen days with the conventional aerobic digestion of WAS (again, as broadly defined herein), whereas only five days retention (after algae introduction) was required in the process involving the phagotrophic algae, achieving at least 35% VS reduction (35% to 40%). Also, conventional treatment required seven days to reach target SOUR, while the process of the invention required only four days to reach that target. At six days in this test, Class B pathogen requirements were exceeded (under 2 million), with pathogen content at 1.21 million. Note that further retention times with the process of the invention will produce further reductions in VS and SOUR, as well as further pathogen reduction.

The examples herein describe batch operations, for both aerobic and anaerobic examples. Particularly for aerobic digestion systems, however, a form of continuous operation will generally be preferred. In a continuous, staged operation, algae need only be seeded initially, and the process will include (possibly following pretreatment of WAS) a first stage where retention time is sufficient to allow algae to establish into a stable population. At appropriate intervals or continuously, a portion of the WAS-algae mixture is moved out of the first stage and into a second stage, or through several additional stages or zones. At the same time, new WAS is brought into the first stage and again, retention time is sufficient that the algae establishes a stable population throughout this first stage. This is repeated as a continuous or continuous, staged operation, with a portion of digestive biomass removed from the final stage at each interval, or with continuous removal. This system will maintain an active algae biomass in the first stage (i.e. first stage following any pretreatment), without the need to grow algae for introduction at relatively long intervals to a batch process. It should be understood, however, that pursuant to the invention both aerobic and anaerobic digestion can be carried out in any of batch, semi-batch (continuous staged), or continuous process.

A second pilot test was conducted, essentially a rerun of the same WAS-algae test reported above in Example 1. This is repeated as Example 2 below, in a somewhat different format. The results show that Class B requirements were met within five days. At day 5 VS reduction and SOUR were met (exceeded), and pathogen content was down to 960,000 at day 5, far exceeding the requirement.

EXAMPLE 2

Aerobic Digestion with Algae

| Parameter | Feed Sludge Day 1 | Algae Conversion Tank Day 1 | Digestion Tank | | | | |
|---|---|---|---|---|---|---|---|
| | | | Day 1 | Day 2 | Day 3 | Day 4 | Day 5 |
| TS (g/l) | 8.06 | 6.96 | 6.39 | 6.22 | 6.07 | 6.01 | 6.02 |
| VS (g/l) | 6.46 | 5.12 | 4.41 | 4.27 | 4.11 | 4.02 | 3.97 |
| NH3—N (mg/l) | 42 | 30 | 26 | 20 | 8 | 10 | 10 |
| SOUR ((mg/g)/h) | " | 3.92 | 2.26 | 1.98 | 1.76 | 1.57 | 1.46 |
| Algal concentration (g/l) | " | 0.49 | 0.06 | 0.02 | 0.01 | 0 | 0 |
| VS reduction (%) | " | 20.75 | 31.79 | 31.72 | 34.2 | 35.8 | 36.5 |
| Pathogen (CFU/g dry weight) | | | | | | | $0.96 \times 10^6$ |

Met Class B requirement in 5 days

Regarding anaerobic digestion, this was described in the copending PCT application (WO publication incorporated herein) as potentially useful for pretreating WAS before mixing with the phagotrophic algae. There was no teaching of subjecting the WAS-algae mixture to anaerobic (digestion) conditions after "allowing the algae to grow by engulfing or uptaking the solid organic material". What took place after that step was simply collecting the resulting algal biomass, as a saleable product.

In contrast, the invention takes the anaerobic digestion preferably to an end point at which all algae have been self-consumed and died. The table for Example 2 below shows test results for anaerobic digestion, with conventional bacterial microbe digestion of WAS (as broadly defined), compared with two different tests wherein phagotrophic algae were added.

EXAMPLE 3

Anaerobic Digestion with Algae

| Initial VS | 30-35000 | mg/L |
|---|---|---|
| T | 30 | ° C. |
| Sample Composition | Days | VS Reduction |
| 100% WAS | 15 | 30% |
| 90% WAS + 10% Algae | 5 | 30% |
| 90% WAS + 10% Algae | 15 | 35% |
| 10% WAS + 90% Algae | 5 | 35% |
| 10% WAS + 90% Algae | 15 | 50% |

The initial VS and process temperature are typical for anaerobic digestion. As shown in the table, conventional 100% WAS anaerobic digestion, to the point that VS reduction of 30% was achieved, took fifteen days.

The algae tests were performed by adding a certain proportion of phagotrophic algae to a portion of WAS having conventional microbes. In the first sample 10% algae biomass was used, while in the second sample the algae biomass constituted 90% of the total. Note that this is not likely to be the way the algae would be introduced in practice, on a large scale, but these compositions were used to obtain test results toward arriving at optimum algae content for the start of the process. WO 2014/194174, incorporated herein, discusses algae growth characteristics under different parameters. The results shown in the table above for Example 3 indicate that 30% VS reduction was achieved in the anaerobic digestion within five days after the mix was at 10% algae, which in this case was at algae introduction. 35% VS reduction was achieved within fifteen days after the mass was at 10% algae.

The table shows further that, with the initial biomass mix at 90% algae, five days were required to reach VS reduction of 35%; and fifteen days were required to achieve reduction of 50%.

These figures compare very favorably with conventional anaerobic digestion. Even in the example with 10% algae, five days were required to achieve the same VS reduction which took fifteen days. The 90% algae sample achieved modestly greater VS reduction at five days than the 10% sample, but significantly greater VS reduction at fifteen days as compared to the 10% sample. In anaerobic digestion, the process preferably will be carried to a finish. This will take advantage of all available VS reduction and biogas production.

One potential reason for the faster anaerobic digestion obtained in the above examples with the phagotrophic algae is that in anaerobic digestion the algae consume bacteria and then are digested themselves, or die off. This certainly occurs with aerobic digestion, and it also possible that phagotrophic ingestion of microbes occurs in the anaerobic process of the invention. Another likely explanation of the successful results reported above is the jump-starting of the acidogenic process by the easily digestible algae biomass and suitably higher lipid contents.

In anaerobic digestion systems, often primary sludge is added to the WAS as it is moved into the digester. Other organic waste such as restaurant food waste may also be added, these additions being made for the purpose of generating additional methane gas during digestion. The more carbon present in the digester, the more methane produced. Primary sludge is influent wastewater that has only been subjected to primary sedimentation or clarification, the sludge being less biologically active than the WAS that is ready for digestion. As noted above, the term WAS as used in the claims is intended to include such combined biomass as well as WAS in its usual meaning.

The process of the invention, the phagotrophic algae-based anaerobic digestion, differs from prior conventional algae-producing processes as represented in most of the prior art referenced above.

Although the use of phagotrophic algae has been described in the above-referenced PCT publications, the processes described in the other referenced prior art were clearly designed for photosynthetic algae. Typical prior processes have included the use of shallow ponds in second and third stages, and the documents describe a pH increase due to photosynthetic assimilation of $CO_2$. The referenced papers on anaerobic digestion of algae both concluded on two main negative aspects of algae, as compared to the digestion of WAS: (1) algal cell walls are more resistant to bacterial degradation, and (2) algae have higher protein (N) contents, thus, when digested, releasing more ammonia and causing ammonia toxicity. These characteristics are again for common photosynthetic algae, not for the phagotrophic algae used in the current process. The phagotrophic algae have no cell walls and therefore are expected to be more easily biodegraded. Further, our studies showed that the phagotrophic algae used in our process has only 2-3% N content, much lower than the 10-14% N content in bacteria. So, ammonia toxicity should be of less concern with the phagotrophic algae than with WAS and photosynthetic algae.

Even more important is, in the current process, the enhancement of digestion by the algae's active phagotrophic behavior that ingests and destroys small microorganisms. The phagotrophic activities convert the WAS bacteria into biomass of the lipid-rich, cell wall-free phagotrophic algae, which is more readily anaerobically digestible subsequently (after the phagotrophic algae have consumed most of the ingestible small microorganisms).

An important advantage of the process of the invention is the easily digestible nature of phagotrophic algae's biomass composition, to jump-start or increase the anaerobic digestion rates. In this regard, the manner in which the phagotrophic algae are originally prepared and grown is not restricted to WAS (with or without primary sludge or other organic waste material) as a medium for growth. The algae can be grown from the wastewater carbon-capturing process, or by use of any other organic wastes or other biologic food sources for the algae.

The above described preferred embodiments are intended to illustrate the principles of the invention, but not to limit its scope. Other embodiments and variations to these preferred embodiments will be apparent to those skilled in the art and may be made without departing from the spirit and scope of the invention.

We claim:

1. A method for effecting efficient digestion of waste activated sludge (WAS) in a wastewater treatment plant, comprising:
   introducing phagotrophic algae to WAS, to produce a WAS-algae mixture,
   subjecting the WAS-algae mixture to digestive conditions in a digestion process,
   maintaining the WAS-algae mixture in the digestion process for a period of time sufficient that concentration of WAS-consuming microorganisms in the mixture is rapidly reduced due to consumption by the phagotrophic algae and the algae become starved and rely on endogenous respiration resulting in degradation of the algae, and sufficient that preselected VS, SOUR and pathogen targets have been met in the digested mixture, to produce a digested biomass, and
   removing the resulting digested biomass from the digestion process.

2. The method of claim 1, wherein the WAS-algae mixture is subjected to aerobic digestion, in a continuous process wherein the algae is introduced to the WAS in a first digestion stage or zone in which retention time is sufficient to allow the algae to establish into a stable population by consuming microbes, while moving a portion of the WAS-algae mixture out of the first stage or zone and into one or more further digestion stages or zones wherein retention time is sufficient to meet said targets, and including bringing additional WAS into the first stage on a continuous basis while removing digestive biomass that has met said targets.

3. The method of claim 1, wherein the WAS-algae mixture is subjected to aerobic digestion, in a continuous, staged digestion process wherein the algae is introduced to the WAS in a first digestion stage in which retention time is sufficient to allow the algae to establish into a stable population by consuming microbes, and at intervals, moving a portion of the WAS-algae mixture out of the first stage and to one or more further digestion stages wherein retention time is sufficient to meet said targets, and including bringing additional WAS into the first stage at each interval as said portion of the WAS-algae mixture is moved out of the first stage.

4. The method of claim 1, wherein the digestion process of the WAS-algae mixture is conducted in a batch process.

5. The method of claim 1, wherein the WAS-algae mixture is subjected to anaerobic digestion.

6. The method of claim 1, wherein the WAS-algae mixture is subjected to aerobic digestion.

7. The method of claim 1, wherein the WAS-algae mixture is subjected to anaerobic digestion and is retained in the digester tank until substantially all microbes and algae have died off.

8. The method of claim 1, wherein the WAS-algae mixture is retained in the digester tank until substantially all microbes and algae have died off.

9. The method of claim 1, wherein the WAS-algae mixture includes primary sludge from the treatment plant.

10. The method of claim 1, wherein the WAS-algae mixture is subjected to anaerobic digestion, and wherein the WAS includes primary sludge from the treatment plant.

11. The method of claim 1, wherein the WAS is subjected to pretreatment involving raising pH above 7.5 and aeration of the WAS to disassociate sludge flocs in order increase accessibility of algae in consuming microorganisms.

12. The method of claim 1, wherein VS reduction of at least 35% and SOUR reduction to below 1.5 mg/g TS/Hr are achieved within ten days.

* * * * *